United States Patent
Ignatiev et al.

(10) Patent No.: US 11,959,477 B1
(45) Date of Patent: Apr. 16, 2024

(54) BEARING AND UNLOADER ASSEMBLY FOR COMPRESSORS

(71) Applicant: Copeland LP, Sidney, OH (US)

(72) Inventors: Kirill Michailovich Ignatiev, Oakwood, OH (US); Robert Christopher Stover, Versailles, OH (US); Mikhail A. Antimonov, Beavercreek, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 17/935,422

(22) Filed: Sep. 26, 2022

(51) Int. Cl.
  *F04C 18/02* (2006.01)
  *F16C 23/08* (2006.01)
  *F16C 35/073* (2006.01)

(52) U.S. Cl.
  CPC ........ *F04C 18/0215* (2013.01); *F16C 23/088* (2013.01); *F16C 35/073* (2013.01); *F04C 2240/50* (2013.01); *F04C 2240/601* (2013.01); *F04C 2240/605* (2013.01)

(58) Field of Classification Search
  CPC ............. F04C 2240/50; F04C 2240/56; F04C 2240/60; F04C 2240/601; F04C 2240/605; F04C 18/0207–0292; F16C 35/073; F16C 23/082; F16C 23/084; F16C 23/086; F16C 23/088; F16C 35/0635
  See application file for complete search history.

(56) References Cited

U.S. PATENT DOCUMENTS

| | | | | |
|---|---|---|---|---|
| 4,730,998 A * | 3/1988 | Kakuda | ................... | F16C 17/03 384/312 |
| 5,174,738 A * | 12/1992 | Baumann | ............ | F04C 18/0215 418/57 |
| 5,186,546 A * | 2/1993 | Abe | ....................... | F16C 23/046 418/57 |
| 5,312,229 A * | 5/1994 | Sano | ......................... | F16D 3/20 464/106 |
| 5,439,360 A * | 8/1995 | Barito | ....................... | F16D 3/16 464/106 |
| 9,841,052 B2 * | 12/2017 | Anstey | ................... | F16C 33/581 |
| 10,208,750 B2 * | 2/2019 | Kawamura | ........ | F04C 18/0215 |
| 10,830,236 B2 | 11/2020 | Ignatiev et al. | | |
| 2006/0266076 A1 * | 11/2006 | Lifson | ................. | F04C 18/0253 62/513 |
| 2019/0345939 A1 * | 11/2019 | Antimonov | ......... | F04C 18/0253 |
| 2020/0332797 A1 * | 10/2020 | Hahn | ................... | F04C 29/0057 |

* cited by examiner

*Primary Examiner* — Mark A Laurenzi
*Assistant Examiner* — Xiaoting Hu
(74) *Attorney, Agent, or Firm* — Armstrong Teasdale LLP

(57) ABSTRACT

A bearing system for a compressor including an unloader at least partially received within a recess of a driveshaft. The unloader includes an outer surface that is engaged with a bearing. An inner surface of the unloader is curved such that the unloader is pivotable relative to the driveshaft unload forces on bearing caused by deflection of the driveshaft.

19 Claims, 13 Drawing Sheets

BEARING AND UNLOADER ASSEMBLY FOR COMPRESSORS

FIELD

The field of the disclosure relates generally to bearing systems, and more particularly, to bearing and unloader assemblies for use in compressors.

BACKGROUND

Scroll compressors compress refrigerant using a scroll assembly including a non-orbiting scroll member and an orbiting scroll member, which cooperate to form one or more sealed chambers therebetween. During the operation of the scroll compressor, motion of the orbiting scroll member relative to the non-orbiting scroll member continuously changes the volume of the sealed chambers compressing refrigerant within.

Scroll compressors typically include one or more bearing assemblies which support rotation of the driveshaft and a drive bearing assembly for transmitting rotational motion of the driveshaft to the orbiting motion of the scroll member. The drive bearing assembly is provided between a drive coupling of an orbiting scroll member and an eccentric portion of the driveshaft. The drive bearing assembly enables the eccentric portion to rotate, applying a tangential driving force to the drive coupling, such that the orbiting scroll member will orbit in translation relative to the non-orbiting scroll member as the driveshaft is driven to effect compression of a fluid.

During operation, the driveshaft experiences applied loads from a variety of sources including driving of the scroll assembly, rotation of a pair of counterweights, and rotor torque, as well as reaction loads from the bearings. These loads may cause deflection of the driveshaft. The magnitude of driveshaft deflection may be dependent on the rotational speed and the operating condition of the compressor. Driveshaft deflection, under these applied loads, leads to bearing wear and/or compressor failure.

Efficient and reliable operation of the compressor is desirable to ensure that the climate-control system in which the compressor is installed is capable of effectively and efficiently providing a cooling and/or heating effect on demand. Furthermore, reducing wear on components, such as bearing assemblies, of the scroll compressor may increase the longevity of the compressor and the climate-control system.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a compressor includes a shell and a driveshaft including a driveshaft body, an eccentric body, and a recess defined at least in part by a back surface. The compressor further includes a non-orbiting scroll disposed within the shell and an orbiting scroll disposed within the shell, the eccentric body drivingly engaged with the orbiting scroll. A bearing housing is fixed within the shell. A bearing is supported by the bearing housing and the bearing is axially spaced from the non-orbiting and orbiting scrolls. The compressor includes an unloader at least partially received within the recess of the driveshaft. The unloader includes inner and outer surfaces. The outer surface is rotatably engaged with the bearing, and wherein at least one of the back surface and the inner surface is curved, and the unloader is pivotable within the recess relative to the driveshaft.

In another aspect, a bearing assembly includes a driveshaft having a driveshaft body, an eccentric body, and a recess defined at least in part by a back surface. The bearing assembly includes a bearing housing and a bearing supported by the bearing housing. The bearing assembly further includes an unloader at least partially received within the recess of the driveshaft, the unloader having inner and outer surfaces, the outer surface engaged with the bearing, and wherein at least one of the back surface and the inner surface is curved, and the unloader is pivotable within the recess relative to the driveshaft.

In yet another aspect, a compressor system includes a compressor operable to compress a refrigerant, the compressor includes a shell and a driveshaft having a driveshaft body, an eccentric body, and a recess defined at least in part by a back surface. The compressor further includes a non-orbiting scroll disposed within the shell and an orbiting scroll disposed within the shell, the eccentric body drivingly engaged with the orbiting scroll. A bearing housing is fixed within the shell and a bearing is supported by the bearing housing. The bearing is axially spaced from the non-orbiting and orbiting scrolls. The compressor system further includes an unloader at least partially received within the recess of the driveshaft, the unloader having inner and outer surfaces, the outer surface engaged with the bearing, and wherein at least one of the back surface and the inner surface is curved, and the unloader is pivotable within the recess relative to the driveshaft. The system also includes a condenser downstream of the compressor and an evaporator downstream of the condenser.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
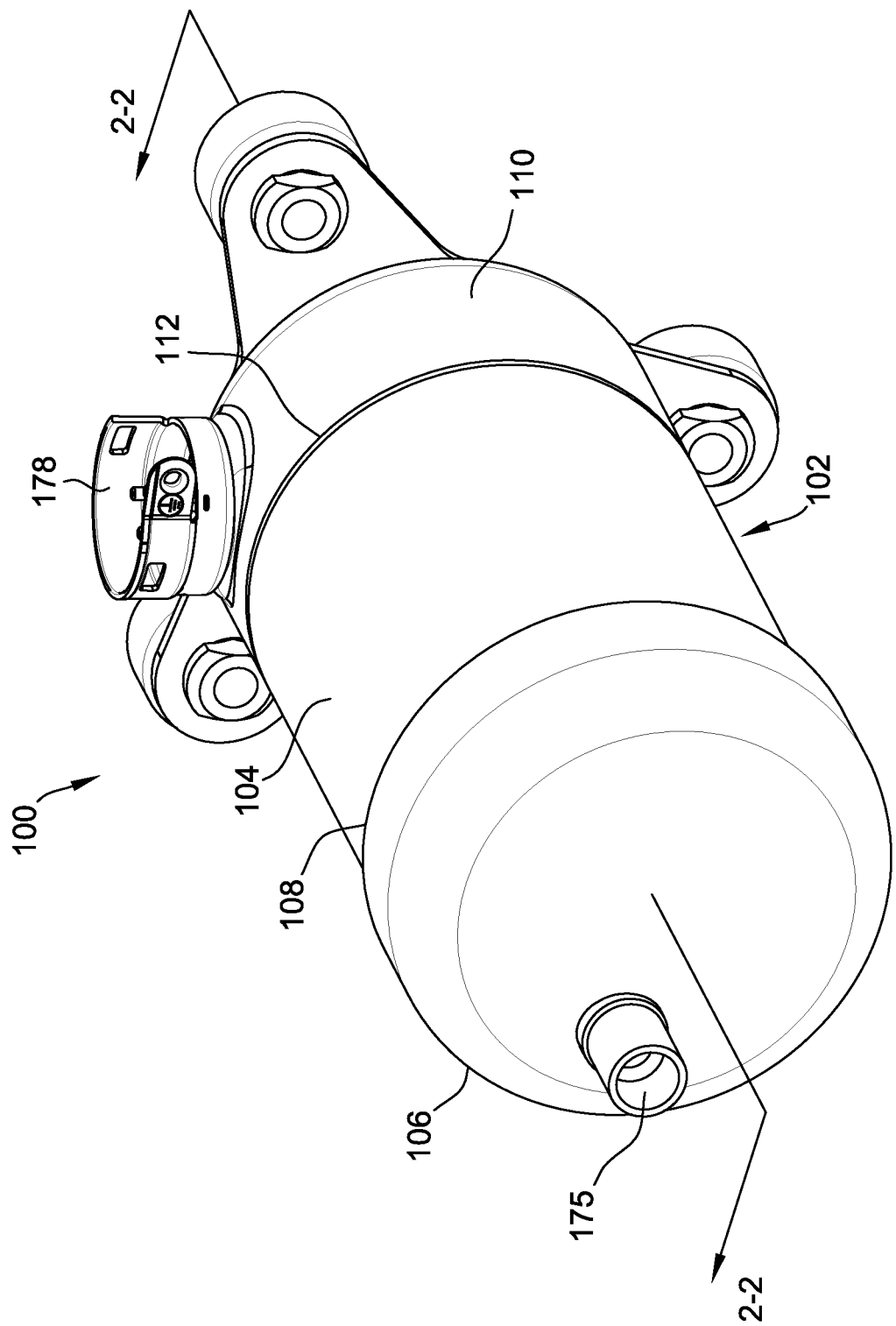
FIG. 1 is a perspective view of a compressor.

Referring to FIG. 1, a compressor, in this example a scroll compressor, is indicated generally at 100. The compressor 100 generally includes a compressor housing 102 forming at least one sealed cavity within which refrigerant compression is accomplished. The compressor housing 102 includes a cylindrical shell 104, and an end cap 106 disposed at a first end 108 of the cylindrical shell 104 and a base 110 disposed at an opposing second end 112 of the cylindrical shell 104.

Figure 2:
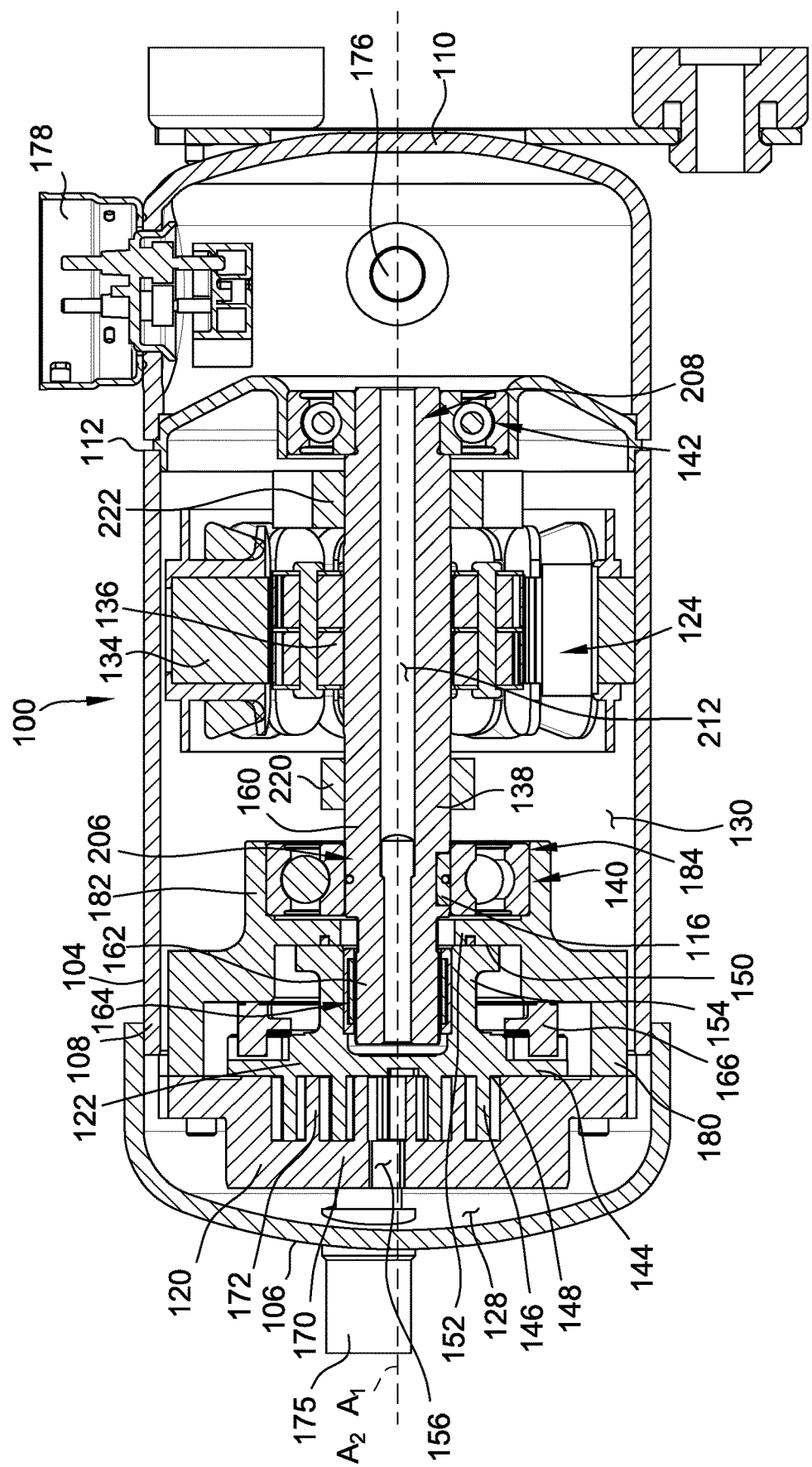
FIG. 2 is a cross-sectional view of the compressor of FIG. 1 taken along line 2-2.

Referring now to FIGS. 1 and 2, the compressor 100 includes a non-orbiting scroll 120 and an orbiting scroll 122 operably engaged with a motor assembly 124. The end cap 106, the non-orbiting scroll 120, and at least a portion of the shell 104 at least partially a defines a chamber 128. The shell 104 at least partially defines a chamber 130. The motor assembly 124 includes a motor stator 134, a rotor 136, and a driveshaft 138. The driveshaft 138 may be press fit within the rotor 136 such that the rotor 136 transmits rotational power to the driveshaft 138. In some embodiments, the motor assembly 124 may be a variable-speed motor to rotate the driveshaft 138 at any of a plurality of speeds. In the illustrated embodiment, the motor assembly 124 is disposed within the cylindrical shell 104. In some other embodiments, the compressor 100 may be an open drive compressor driven by a motor assembly 124 that is disposed outside of the compressor housing 102. The compressor 100 further includes a first bearing assembly 140 and a second bearing assembly 142 that may rotationally support the driveshaft 138.

The driveshaft 138 may be exposed to one or more loads during refrigerant compression which results in deflection of the driveshaft 138. In the embodiments described herein, the compressor 100 includes an unloader 116 at least partially contained within a recess 118 formed on the driveshaft 138. The unloader 116 is engaged with at least one of the first bearing assembly 140 or the second bearing assembly 142 and provides compliance between the driveshaft 138 and at least one of the first or second bearing assemblies 140, 142 to unload forces on the first or second bearing assemblies 140, 142 resulting from deflections of the driveshaft 138, as will be described in further detail herein.

The driveshaft body 160 includes a longitudinal axis $A_1$. An axial direction includes a direction aligned with, and/or parallel to, the longitudinal axis $A_1$. A radial direction includes a direction that is in a radial direction relative to the longitudinal axis $A_1$ and perpendicular to the longitudinal axis $A_1$. The driveshaft 138 includes a driveshaft body 160 and an eccentric body 162 that may be offset from the driveshaft body 160. The driveshaft body 160 and the eccentric body 162 are cylindrical in shape. The eccentric body 162 includes a longitudinal axis A2 that is off set from the longitudinal axis A1. See FIGS. 6 and 7. The driveshaft body 160 includes a first end portion 206 and second end portion 208 rotatably supported by the first and second bearing assemblies 140, 142 respectively. The eccentric body 162 may extend from the first end portion 206.

The orbiting scroll 122 may include an end plate 144 having a spiral wrap 146 extending from a first side 148 and an annular flat surface 150 on a second side 152. The surface 150 may interface with the first bearing assembly 140, as will be subsequently described. The orbiting scroll 122 may further include a cylindrical hub 154 that projects downwardly from the end plate 144. The eccentric body 162 of the driveshaft 138 may be drivingly engaged to a drive bearing 164. The drive bearing 164 transmits rotational motion from the eccentric body 162 to the orbiting scroll 122. The drive bearing 164 may be disposed within the cylindrical hub 154 of the orbiting scroll 122. A coupling 166, such as an Oldham coupling, may be engaged with the orbiting scroll 122 and the non-orbiting scroll 120, or the bearing housing 180, to prevent relative rotation therebetween. At least a portion of the bearing housing 180 may partially define a boundary between the chamber 128 and the chamber 130.

The non-orbiting scroll 120 may include an end plate 170 and a spiral wrap 172 projecting downwardly from the end plate 170. The spiral wrap 172 may engage with the spiral wrap 146 of the orbiting scroll 122, e.g., by meshing engagement of the wraps with one another, thereby creating a series of moving fluid pockets. The fluid pockets defined by the spiral wraps 146, 172 may decrease in volume as they move from a radially outer position (e.g., at a suction pressure) to a radially inner position (e.g., at a discharge pressure that is higher than the suction pressure) throughout a compression cycle. The end plate 170 may include a discharge passage 156, that is in communication with at least one of the fluid pockets at the radially inner position and allows compressed working fluid, such as refrigerant or a mixture of refrigerant and lubricant, (at or near the discharge pressure) to flow therethrough and into the chamber 128.

An inlet 175 is attached to the compressor housing 102 in the end cap 106, for drawing the working fluid into the fluid pockets defined by the spiral wrap 172 and the spiral wrap 146, where the working fluid is compressed. After the working fluid is compressed, the compressed working fluid exits the fluid pocket defined by the spiral wrap 172 and the spiral wrap 146 through the discharge passage 156 and into chamber 128. The compressed working fluid flows from the chamber 128 into chamber 130 through one or more passages between the non-orbiting and orbiting scrolls 120, 122, and the cylindrical shell 104. The compressed working fluid exits the chamber 130 through a discharge fitting 176. The discharge fitting 176 may be attached to the compressor housing 102 in the cylindrical shell 104. A discharge valve assembly, not shown, may be disposed within the discharge fitting 176 and may generally prevent a reverse flow condition through the discharge fitting 176. A hermetic terminal 178 may be attached to the compressor housing 102 at the base 110.

Referring to FIGS. 2 and 3, the compressor 100 includes a bearing housing 180 that may be fixed relative to the compressor housing 102. Additionally, and/or alternatively, the bearing housing 180 may be connected to the non-orbiting scroll 120. The bearing housing 180 includes an annular hub 182 defining a cavity 184 that is sized and shaped to receive the first bearing assembly 140 therein. The bearing housing 180 and first bearing assembly 140 may cooperate to support the driveshaft 138 for rotational motion relative thereto. The bearing housing 180 may also axially support the orbiting scroll 122 for orbital motion relative thereto.

Referring to FIGS. 2-5, the first bearing assembly 140 is a ball bearing including an outer ring 190, an inner ring 192 and a plurality of balls 200 disposed between the outer ring 190 and the inner ring 192. In other embodiments, the first bearing assembly 140 may include other types of rolling bearings. The inner ring 192 includes an inner surface 202 defining a bearing opening 204. The driveshaft body 160 is disposed within the bearing opening 204. In the illustrated embodiment, the driveshaft body 160 has a diameter $D_{160}$ that is less than a diameter $D_{204}$ of the bearing opening 204 defined by the inner surface 202 of the inner ring 192, such that the driveshaft body 160 is spaced, in the radial direction, from the inner ring 192. In some embodiments, the diameter $D_{160}$ may be between 0.2 and 0.6 mm less than the diameter $D_{204}$. Accordingly, there may be a radial clearance between the driveshaft body 160 and the inner surface 202 of between 0.1 and 0.3 mm.

A passage 212 may extend through the length of the driveshaft 138. In some embodiments, oil may also flow from the passage 212 to the bearing through a supply passage that extends radially outward from the passage 212. Alternatively, and/or additionally, refrigerant may flow through passage 212. In some embodiments, a mixture of oil and refrigerant may flow through passage 212.

As shown in FIG. 2, a first counterweight 220 and a second counterweight 222 may be attached to the driveshaft body 160 between the first and second bearing assemblies 140, 142 to rotationally balance the driveshaft 138. The first and second counterweights 220, 222 may be configured and positioned such that an inertial force of the first counterweight 220 may counteract or balance a sum of inertial forces of the second counterweight 222, the orbiting scroll 122, and the eccentric body 162.

Referring to FIG. 3, the recess 118 is formed on the driveshaft body 160, at or proximate the first end portion 206. The recess 118 may be generally aligned with the first bearing assembly 140 in the axial direction. The recess 118 is defined, at least in part, by a first axial end 232, a second axial end 234, and a back surface 236 formed on the driveshaft body 160. See FIG. 7. The first and second axial ends 232, 234 may define respective planes that may be substantially perpendicular to, and intersecting, the longitudinal axis $A_1$ of the driveshaft body 160. The back surface 236 extends in the axial direction, parallel to the longitudinal axis $A_1$, from the first axial end 232 to the second axial end 234. The back surface 236 may be substantially planar, such that the back surface 236 is perpendicular to the first and second axial ends 232, 234.

The driveshaft body 160 includes a radius $R_{160}$ extending between the driveshaft axis $A_1$ and an outer surface 210 of the driveshaft body 160 and a distance $R_{236}$ extending between the driveshaft axis $A_1$ and the back surface 236. The distance $R_{236}$ is less than $R_{160}$, and the difference between the radius $R_{160}$ and the distance $R_{236}$ is a recess depth $D_{116}$ of the recess 118. In particular, the recess depth $D_{118}$ is defined between the back surface 236 of the recess 118 and the outer surface 210 of the driveshaft body 160. Accordingly, the recess depth $D_{118}$ changes along the recess width $W_{118}$ of the recess 118. The distance $R_{236}$ may be selected based on one or more dimensions of the unloader 116 and the driveshaft body 160.

Figure 4:
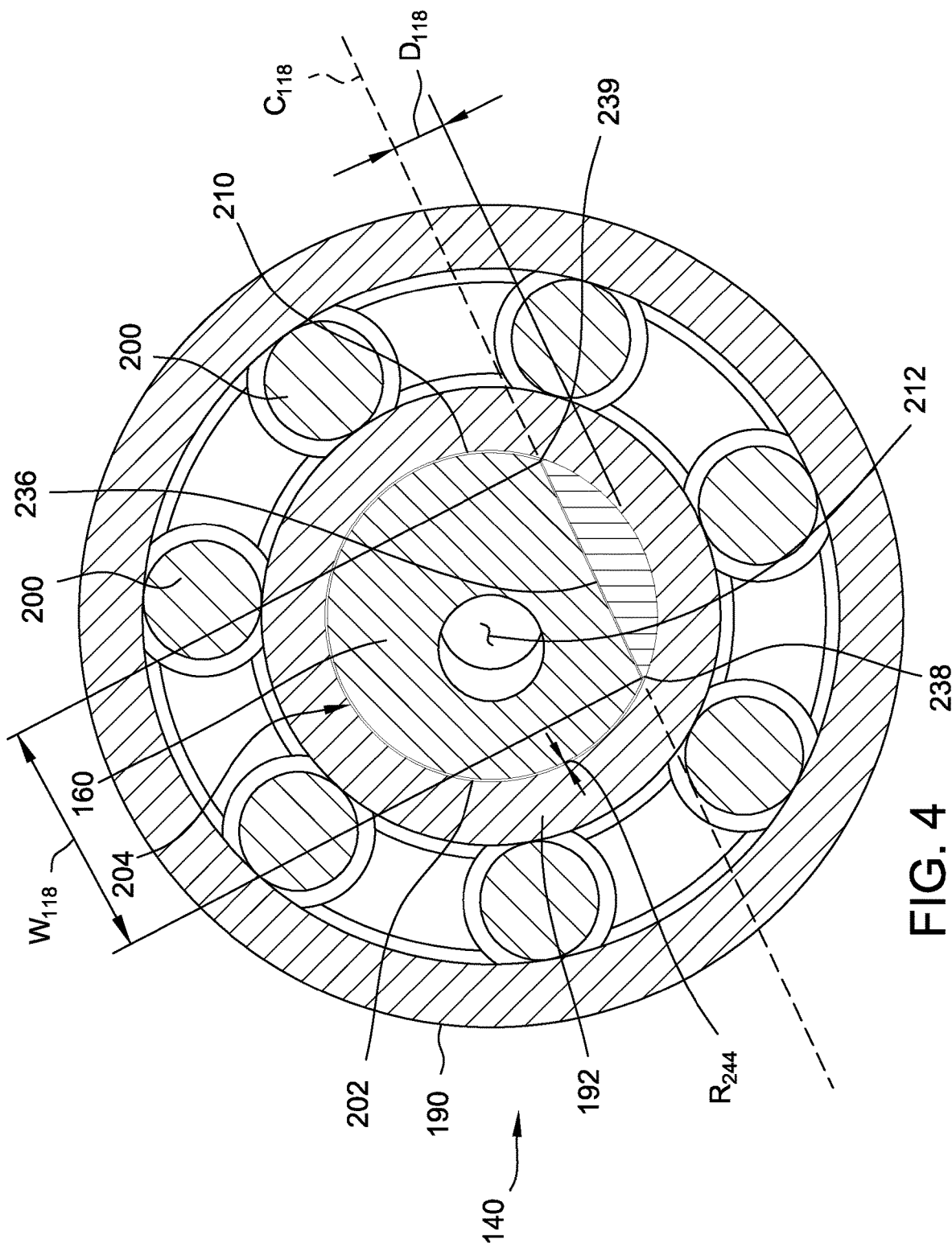
FIG. 4 is a cross-sectional view of the bearing assembly shown in FIG. 3A taken along line 4-4.
Figure 5:
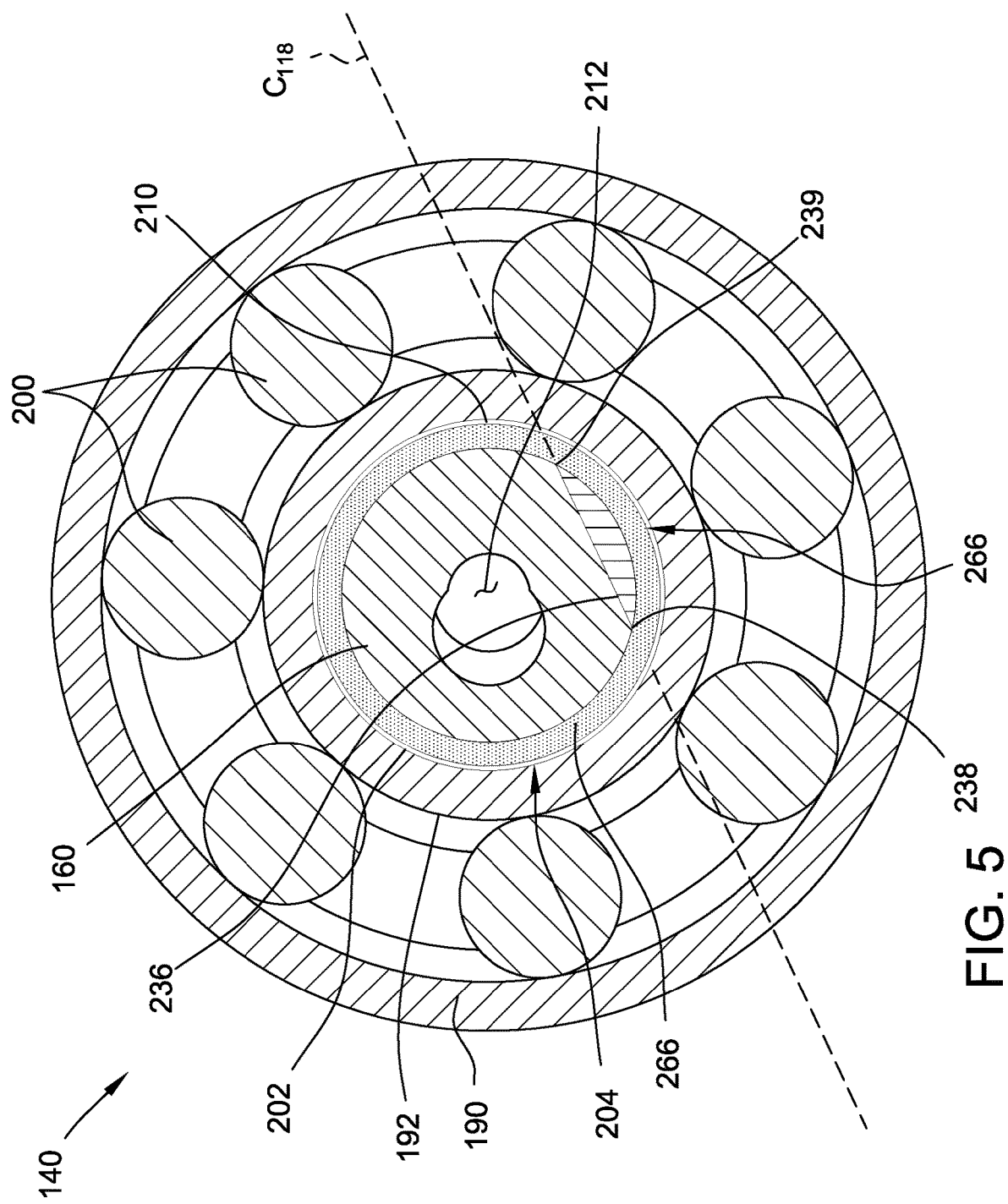
FIG. 5 is a cross-sectional view of the bearing assembly shown in FIG. 3A taken along line 5-5.

Referring to FIGS. 4 and 5, the back surface 236 extends along a chord $C_{118}$ of the driveshaft body 160 between a first longitudinal edge 238 and a second longitudinal edge 239.

See FIG. 4. The back surface 236 of the recess 118, defines a recess width $W_{118}$, extending from the first longitudinal edge 238 to the second longitudinal edge 239. In particular, the recess width $W_{118}$ is a length of the chord $C_{118}$ along which the back surface 236 extends. A recess height $H_{118}$ extends between the first and second axial ends 232, 234, in the axial direction. See FIG. 3.

Figure 3A:
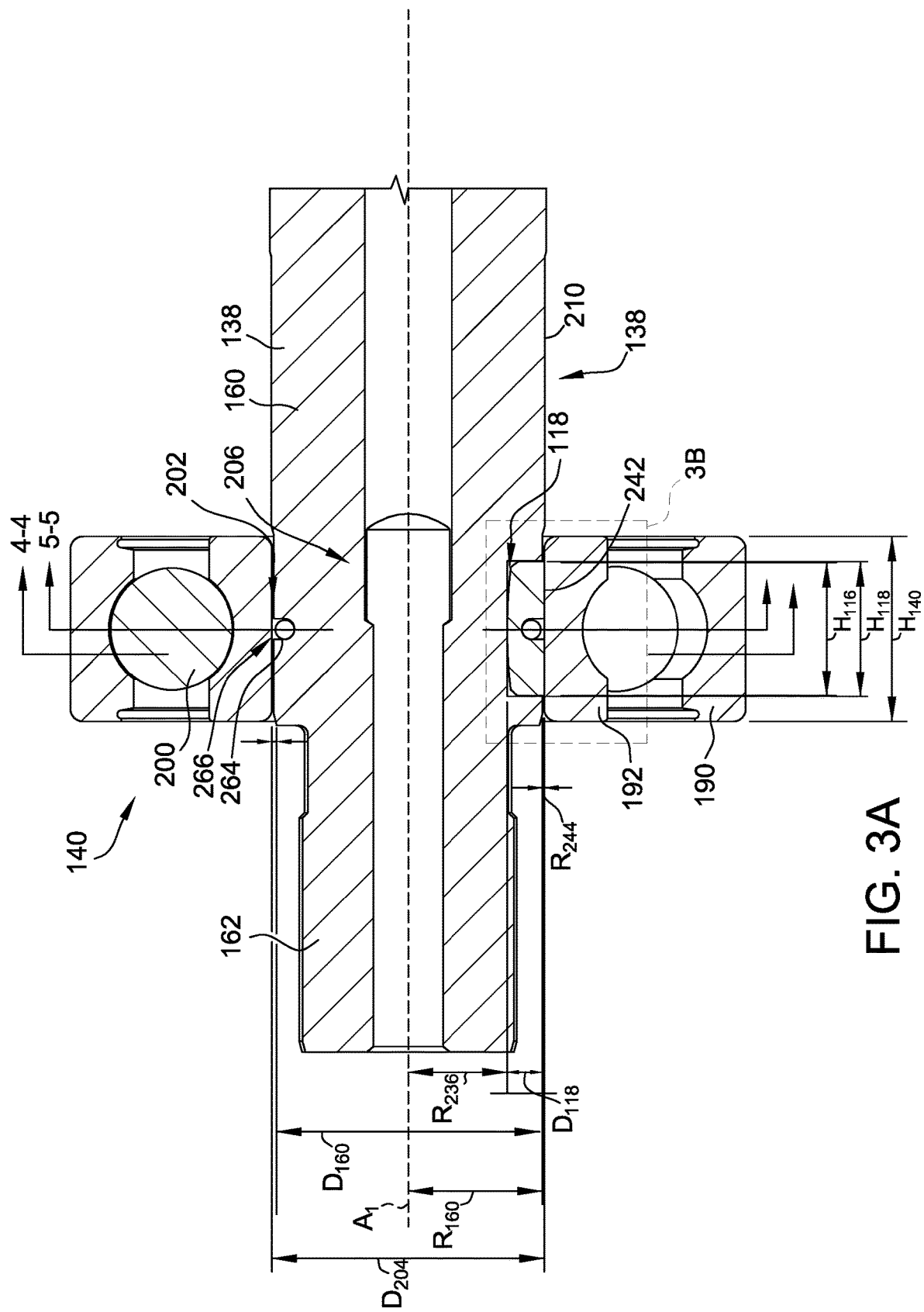
FIG. 3A is a cross-sectional view of a bearing assembly of the compressor shown in FIGS. 1 and 2, with the bearing assembly removed from a compressor housing of the compressor.
Figure 3B:
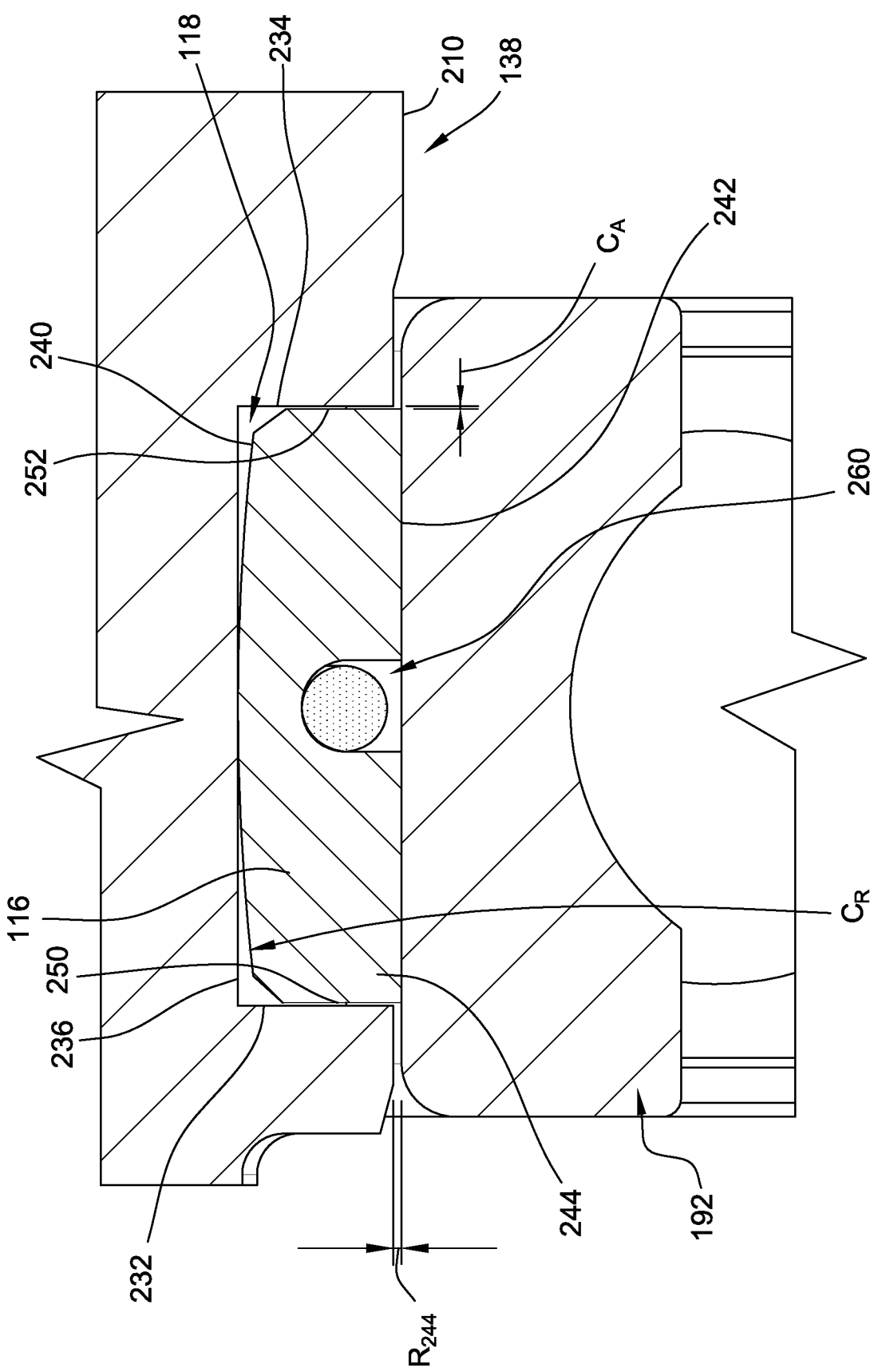
FIG. 3B is a detailed cross-sectional view of a bearing assembly of the compressor shown in FIGS. 1 and 2, with the bearing assembly removed from the compressor housing.

Referring to FIGS. 3A and 3B, the unloader 116 includes an inner surface 240 and an opposing outer surface 242. The inner surface 240 is arranged in proximity to the back surface 236 of the recess 118, when the unloader 116 is received within the recess 118. In some embodiments, at least a portion of the inner surface 240 may be in contact with the back surface 236 of the recess 118 when the unloader 116 is received within the recess 118. In the illustrated embodiment, at least a portion of the inner surface 240 is displaced from the back surface 236, such that there is a radial clearance CR between the back surface 236 and at least a portion of the unloader 116. At least a portion of the unloader 116 is disposed outside of the recess 118, when the unloader 116 is received within the recess 118. In particular, the outer surface 242 is disposed outside of the recess 118 when the unloader 116 is received within the recess 118. The unloader 116 includes an extension portion 244 extending radially outward beyond the outer surface 210 of the driveshaft body 160. The unloader 116 is engaged with the first bearing assembly 140, and the extension portion 244 of the unloader 116 may prevent the driveshaft body 160 from contacting the inner ring 192. In particular, the outer surface 242 is disposed outside of the recess 118 and is in contact with the inner surface 202 of the inner ring 192 of the first bearing assembly 140, such that the unloader 116 rotates with the rotations of the inner ring 192. The extension portion 244 may include a radial thickness $R_{244}$ of between 0.1 and 0.3 mm. In some embodiments, the radial thickness $R_{244}$ may be between 0.3 and 0.75 mm. In some embodiments, the extension portion 224 includes a radial thickness $R_{244}$ that is equal to, or greater than, a radial clearance between the driveshaft body 160 and the inner surface 202.

In the illustrated embodiment, the outer surface 242 is curved having a radius of curvature that is substantially the same as a radius of curvature of the inner surface 202 of the inner ring 192. Additionally, and/or alternatively, the radius of curvature of the unloader 116 may be substantially similar to a radius of curvature of the outer surface 210 of the driveshaft body 160. The first bearing assembly 140 may include an axial height $H_{140}$ that is greater than the unloader height $H_{116}$. In some embodiments, the unloader height $H_{116}$ is greater than the axial height $H_{140}$ of the first bearing assembly 140. The unloader 116, the recess 118, and the first bearing assembly 140 may be arranged such that the unloader 116 is axially centered relative to the axial height $H_{140}$ of the first bearing assembly 140.

In some embodiments, the unloader 116 is suitably made of a thermoplastic polymer such as polyether ether ketone (PEEK). Alternatively, in some embodiments, the unloader 116 may be composed of steel and/or a steel alloy. The unloader 116 may be made of any material having suitable properties.

The unloader 116 includes an upper surface 250 and an opposing lower surface 252 that are generally planar and are arranged parallel to each other. When the unloader 116 is received within the recess 118, the upper and lower surfaces 250, 252 are arranged in proximity to, and/or are in contact with the first and second axial ends 232, 234 defining the recess 118. The unloader 116 includes a height Him extending between the upper and lower surfaces 250, 252. In some embodiments, the unloader 116 height $H_{116}$ is slightly less than the recess height $H_{118}$ such that there is an axial clearance CA between at least one of the upper and lower surfaces 250, 252 and the first and second axial ends 232, 234 defining the recess 118. The axial clearance CA may be between 0.001 and 0.125 mm. In some embodiments, the axial clearance CA may be between 0.125 and 1 mm. In some embodiments, the axial clearance CA may be greater than 0.125 mm. Accordingly, the unloader 116 may translate, along the axial direction, within the recess 118, for the axial clearance CA. In other embodiments, the unloader height $H_{116}$ may be the same or substantially the same as the recess height $H_{118}$.

Still referring to FIGS. 3A-3B, the radial clearance CR and the axial clearance CA between the unloader 116 and the recess 118 may provide compliance, in the axial and/or the radial direction, between the driveshaft 138 and the first bearing assembly 140. In particular, the unloader 116 may pivot, e.g., rotate, within the recess 118, relative to the driveshaft 138. The unloader 116 may pivot within the recess about any suitable axis in either a clockwise and/or a counterclockwise direction. In some embodiments, the unloader 116 may move, e.g., translate and/or rotate, relative to the driveshaft 138. The recess 118 and the unloader 116 may be any suitable complementary configuration such that the unloader 116 may be at least partially received within the recess 118 to enable the unloader 116 to function as described herein.

Figure 6:
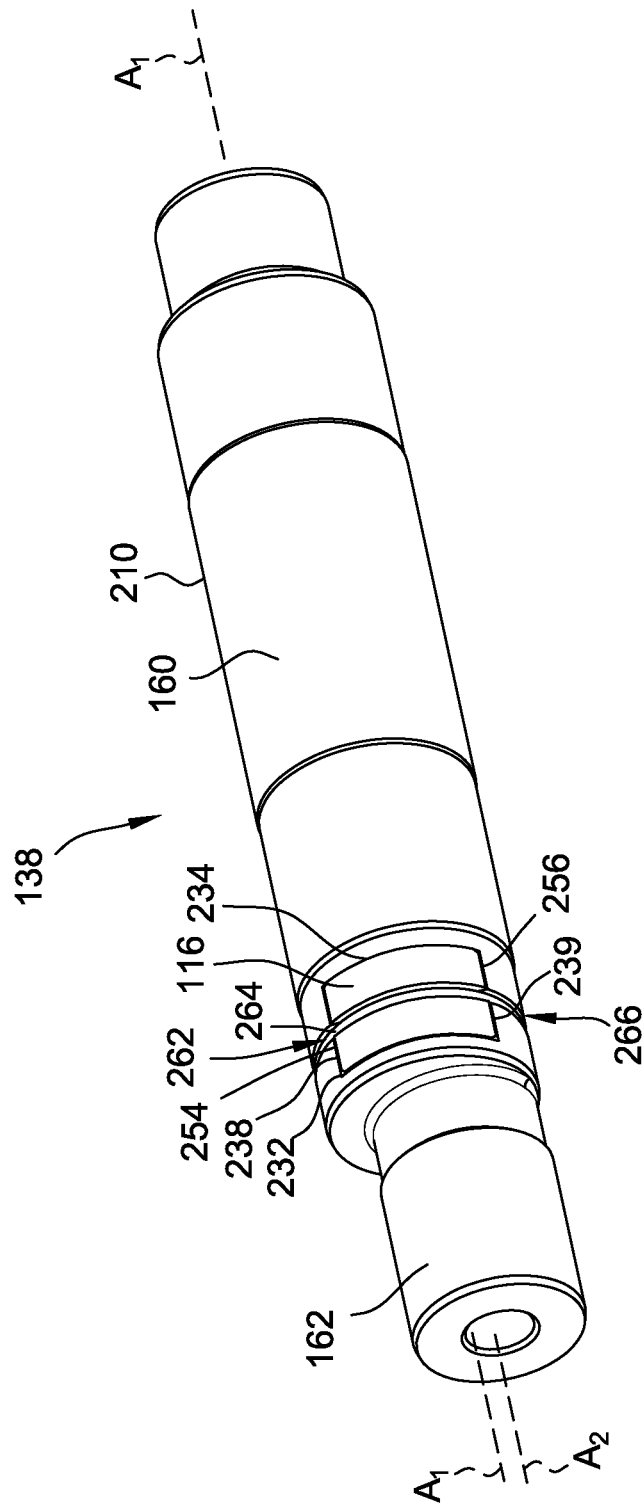
FIG. 6 is a perspective view of a driveshaft and an unloader at least partially disposed within a recess of the driveshaft, the driveshaft and the unloader removed from the bearing assembly shown in FIG. 3A.
Figure 7:
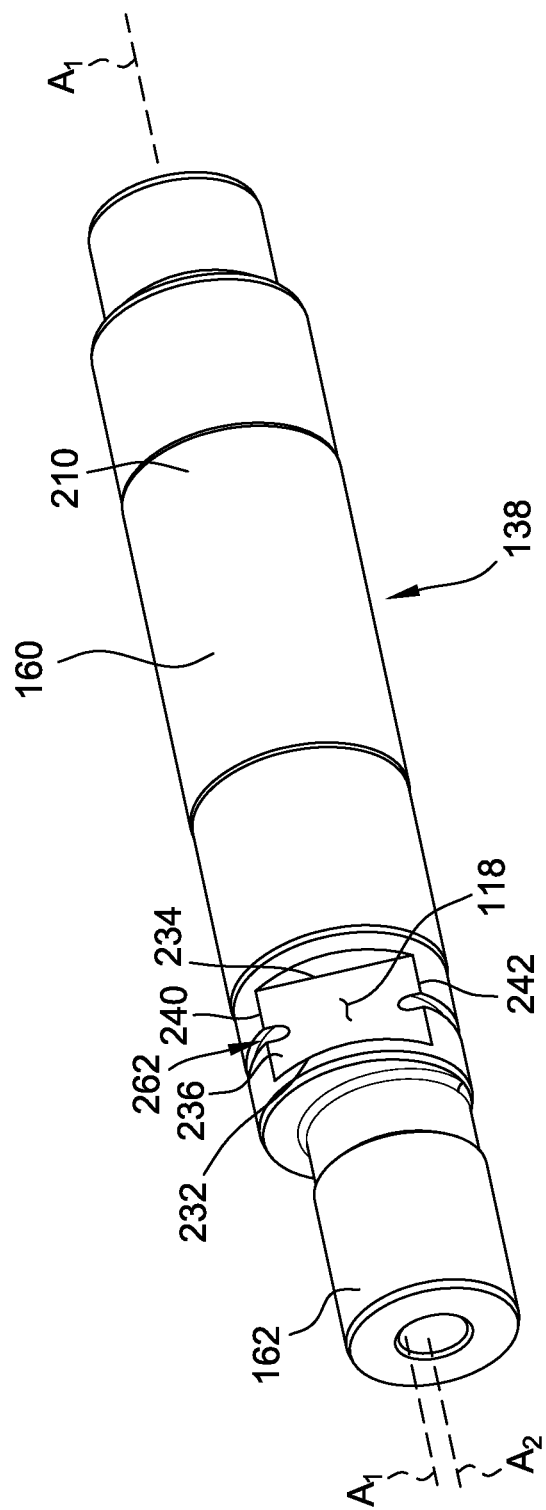
FIG. 7 is a perspective view of the driveshaft of FIG. 6, having the unloader removed from the recess on the driveshaft.

The unloader includes a channel 260 formed on the outer surface 242 of the unloader 116. The driveshaft body 160 also includes a channel 262. When the unloader 116 is disposed within the recess 118 the channel 260 is aligned with channel 262 such that a continuous annular channel 266, see FIG. 6, is formed around an entire circumference of the driveshaft body 160. The annular channel 266 may be sized and shaped to receive a retention ring 264 therein. The retention ring 264 may retain the unloader 116 within the recess 118 during an assembly process as described in relation to FIG. 10. In the illustrated embodiment, the annular channel 266 is circular in its cross section.

Figure 8:
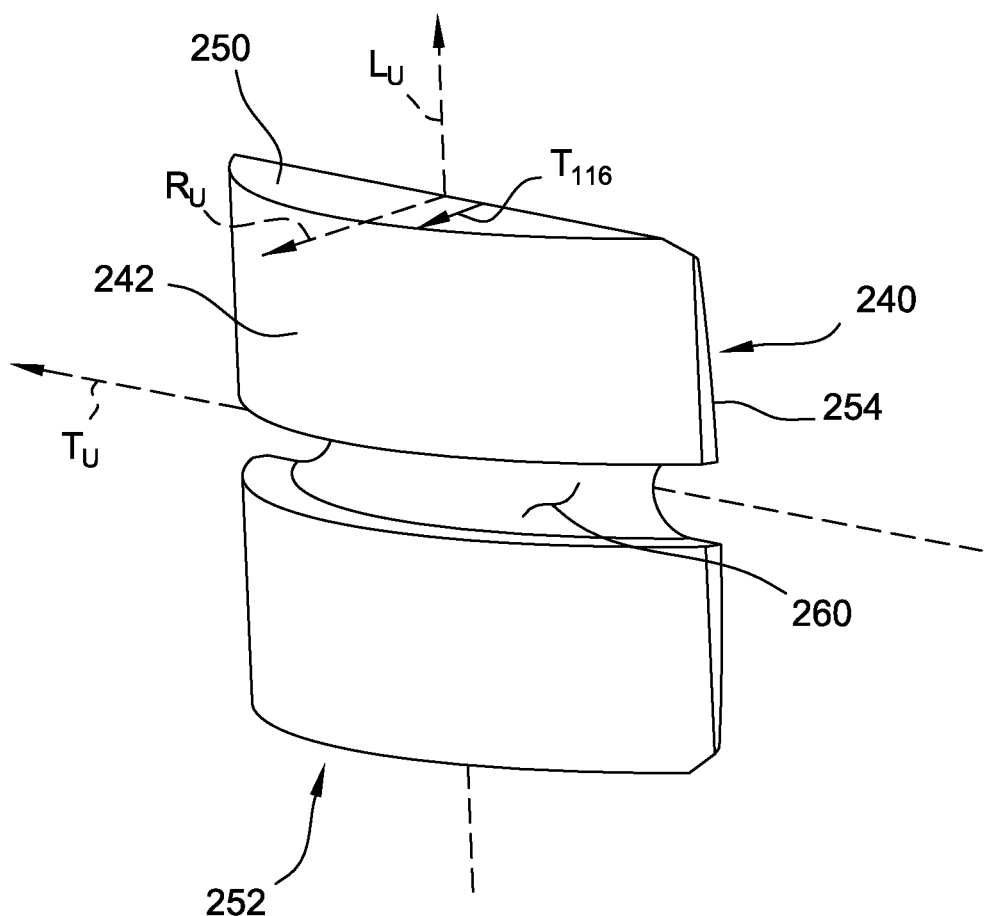
FIG. 8 is a front perspective view of the unloader.
Figure 9:
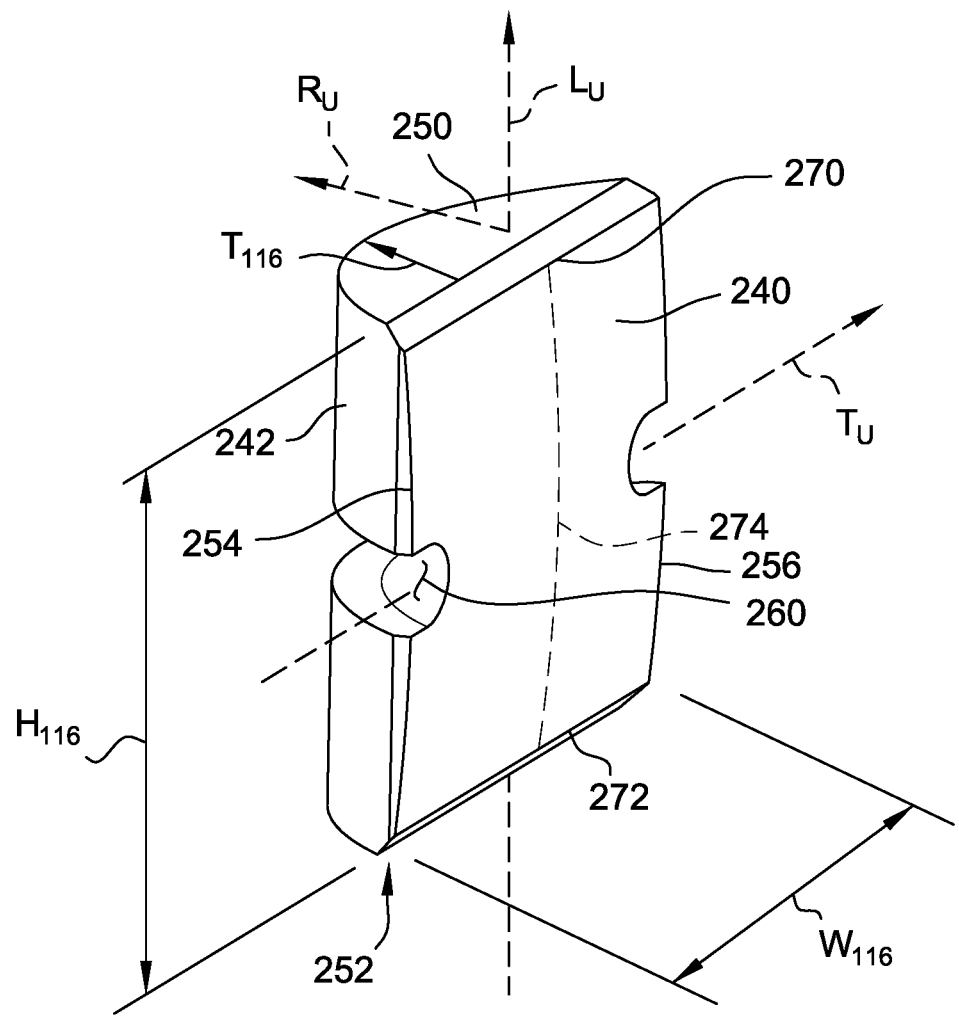
FIG. 9 is a rear perspective view of the unloader.
Figure 10:
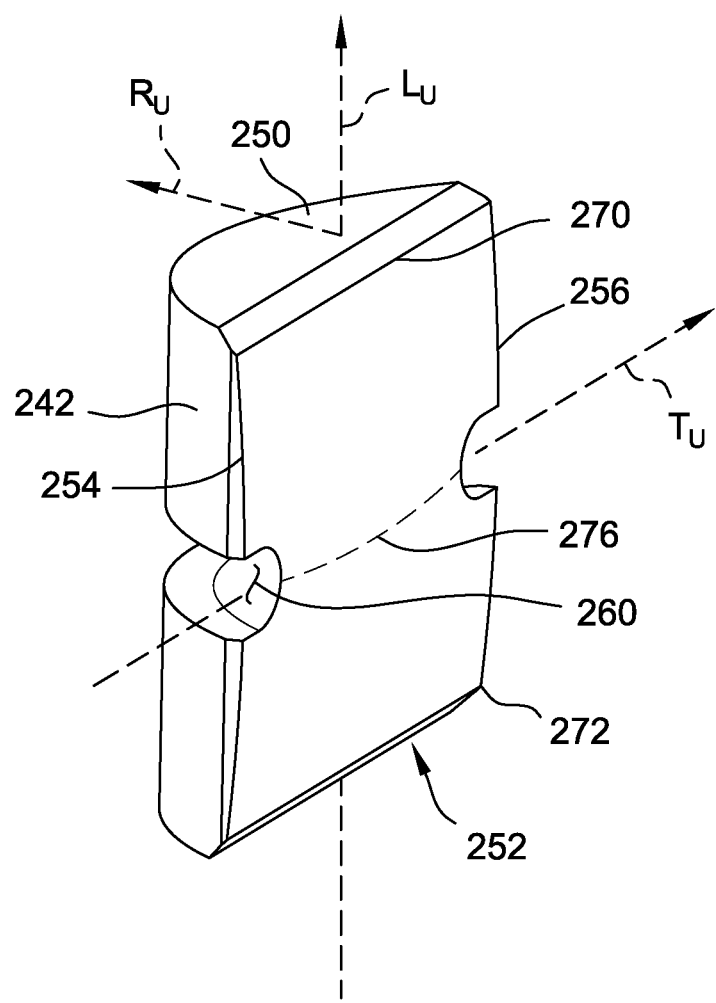
FIG. 10 is a rear perspective view of another unloader.

FIGS. 8-10 illustrate a detailed view of the unloader 116. The unloader 116 includes an unloader radial thickness $T_{116}$ which extends between the inner surface 240 and the outer surface 242 along a radial axis $R_U$ of the unloader 116. As described above, the unloader 116 radial thickness $T_{116}$ is greater than the recess depth $D_{118}$ such that the extension portion 244 of the unloader 116 is disposed outside of the recess 118, when the unloader is received within the recess 118. In the illustrated embodiment, the radial thickness $T_{116}$ and the distance $R_{236}$ may be equal to half of the diameter $D_{204}$ of the bearing opening 204.

The unloader 116 includes an unloader longitudinal axis $L_U$ extending between the upper and lower surfaces 250, 252, perpendicular to the radial axis $R_U$ of the unloader 116. When the unloader 116 is received within the recess 118, the unloader longitudinal axis $L_U$ may be generally parallel to the longitudinal axis $A_1$. The unloader 116 includes a first edge 254 and a second edge 256. The unloader 116 also includes a transverse axis $T_U$ extending between the first and second edges 254, 256. The transverse axis $T_U$ is perpendicular to the unloader longitudinal axis $L_U$. The inner surface 240 extends in the transverse direction $T_U$ between the first and second edges 254, 256. The unloader 116 further includes width $W_{116}$ extending between the first edge 254 and the second edge 256, in a direction along the transverse axis $T_U$. When the unloader 116 is received within the recess 118, the first and second edges 254, 256 are arranged in proximity to the first and second longitudinal edges 238, 239 of the recess 118.

The unloader 116 also includes an upper edge 270 and a lower edge 272, the inner surface 240 extends in the longitudinal direction $L_U$ between the upper and lower edges 270, 272. First and second edges 254, 256 and/or the upper and lower edges 270, 272 may include a chamfer.

The inner surface 240 in this embodiment is curved, as shown in FIG. 9. The curvature of the inner surface 240 is such that when the unloader 116 is received within the recess 118, a portion of the inner surface 240 may be in contact with the back surface 236 and a portion of the inner surface 240 is spaced from the back surface 236. The curvature of the inner surface 240 enables the unloader 116, to pivot and/or move within the recess 118. For example, the curved inner surface 240 may allow the unloader 116 to flex, and/or rock, within the recess 118 relative to, and/or against, the back surface 236. The motion of the unloader 116 with in the recess 118 may allow the unloader 116 to align with the first bearing assembly 140, thereby decreasing the impact of misalignment due to operation and manufacturing tolerances on the bearing life. The inner surface 240 curvature decreases the loading, and/or releases the loading, on the upper and lower edges 270, 272 of the unloader 116 against the first axial end 232, the second axial end 234, and the back surface 236 formed on the driveshaft body 160. The curved inner surface 240 may also reduce friction between the inner surface 240 and back surface 236 by providing access to a lubricant, such as oil, to the clearance CR between unloader 116 and back surface 236, increasing the life of the unloader 116 and the driveshaft 138.

In some embodiments, the inner surface 240 is convex. Referring to FIG. 9, the inner surface 240 may be convex in a direction parallel to the unloader longitudinal axis $L_U$, between the upper and lower edges 270, 272. For example, in some embodiments, the unloader 116 may include a longitudinal convex portion 274. Referring to FIG. 10, in alternative embodiments, the inner surface 240 may be convex in a direction parallel to the unloader 116 transverse axis $T_U$, between the first and second edges 254, 256 having a transverse convex portion 276.

The unloader 116 having a longitudinal convex inner surface 240, FIG. 9, may be able to pivot, relative to the driveshaft 138, within the recess 118 about the unloader transverse axis $T_U$. The unloader 116 having a transverse convex inner surface 240, FIG. 10, may be able to pivot, relative to the driveshaft 138, within the recess 118 about the longitudinal unloader axis $L_U$.

The inner surface 240 may alternatively be dome shaped (not shown). The dome shaped inner surface 240 includes a peak and a surrounding surface that slopes away from the peak. The peak is a point, and/or an area, that is most displaced in the radial direction from the first and second edges 254, 256, and the upper and lower edges 270, 272. Accordingly, when the unloader 116 is received within the recess 118, the peak may be in contact with the back surface 236 and the surrounding surface, around the peak, is displaced from the back surface 236. The peak may be centered on the back surface 236. Alternatively, the peak may be positioned at any location on the inner surface 240 that enables the unloader 116 and the bearing assembly to function as described herein.

In some embodiments, at least one of the back surface 236 or the inner surface 240 is curved. For example, in some embodiments, the inner surface 240 may be planar and the back surface 236 may be curved, e.g., between the first axial end 232 and the second axial end 234. For example, the back surface 236 may be convex, e.g., longitudinal convex and/or transversely convex. Alternatively, the back surface 236 may be domed shaped.

Figure 11:
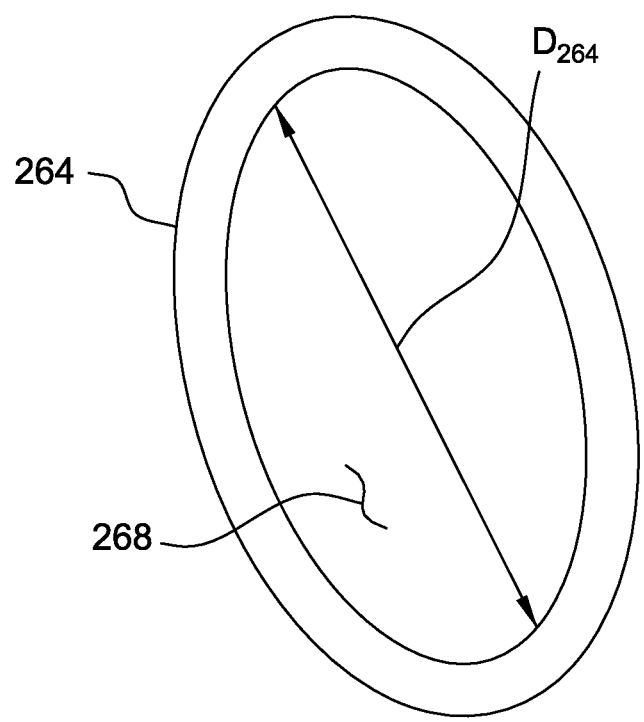
FIG. 11 is a perspective view of a retention ring.

Referring to FIG. 11, the retention ring 264 of this embodiment is annular in shape, having an inner diameter $D_{264}$ defining a ring opening 268. In the illustrated embodiment, the retention ring 264 has a cross-section that is circular. The retention ring 264 may be composed of materials having elastic properties that allow the retention ring 264 to stretch. The retention ring 264 may be used to retain the unloader 116 within the recess 118 during an assembly method. For example, the unloader 116 may be inserted into the recess 118, until at least a portion of the inner surface 240 is in contact with the back surface 236 of the recess 118. Next, the driveshaft 138, with the unloader 116 received within the recess 118, may be passed through the ring opening 268 of the retention ring 264. In some assembly methods, the retention ring 264 may be stretched, slightly, to increase the size of the ring opening 268, such that the driveshaft body 160 may be passed into a larger ring opening 268 of the retention ring 264. The driveshaft body 160, with the unloader 116 received within the recess 118, may be passed through the ring opening 268 until the retention ring 264 is axially aligned with the channel 260 formed on the unloader 116 and the channel 262 formed on the driveshaft body 160, e.g., the continuous annular channel 266. Once the retention ring 264 is axially aligned with channel 266, the retention ring 264 may be released, allowing the retention ring 264 to return to its original, unstretched, size, thereby positioning the retention ring 264 within the annular channel 266.

The retention ring 264 and the annular channel 266 may be any suitable complementary configuration such that the retention ring 264 may be received within the annular channel 266, enabling the unloader 116 and the first bearing assembly 140 to function as described herein. In alternative embodiments, the compressor 100 may include more than one retention ring 264 and/or annular channel 266. In some embodiments, the retention ring 264 may be metallic, and the retention ring 264 may include a split allowing the retention ring 264 to be expanded, increasing the inner diameter $D_{264}$, such that the retention ring 264 may be placed around the driveshaft body 160 and the unloader 116 to position the retention ring 264 within the annular channel 266. During refrigerant compression, when the retention ring 264 is contained within the annular channel 266, the retention ring 264 is not in contact with the first bearing assembly 140. More specifically, the retention ring 264 is spaced from the inner surface 202 of the inner ring 192 of the first bearing assembly 140. FIGS. 3A-B and 4, show the retention ring 264 contained within the annular channel 266 and spaced away from the inner ring 192.

While the driveshaft 138 and unloader 116 are described above as being incorporated into a scroll compressor, it will be appreciated that the principles of the present disclosure may be applicable to other types of compressors, such as horizontal and/or open-drive for example, or any other type of high-side or low-side compressor or pump. The driveshaft 138 and unloader 116 could be incorporated into a compressor having a floating non-orbiting scroll (e.g., an axially compliant non-orbiting scroll) or a compressor having a fixed non-orbiting scroll.

While compression is achieved using a scroll-type compression mechanism, it will be appreciated that the principles of the present disclosure may be applicable to rotary compressors. For example, the driveshaft 138 including the unloader 116, and the first bearing assembly 140 may be configured to drive a rotor of a rotary-type compression mechanism.

The first bearing assembly 140, the driveshaft 138, and the unloader 116 may be used as part of a method of assembling the compressor 100. The assembly method includes mounting the bearing housing 180 to the compressor housing 102. The assembly method also includes inserting the first bearing assembly 140 into the cavity 184 defined by the annular hub 182 of the bearing housing 180. The method further includes inserting the unloader 116 into the recess 118. For example, the unloader 116 may be inserted into the recess 118 by moving the unloader 116 along a direction that is generally perpendicular to the longitudinal axis $A_1$. Alternatively, the unloader 116 may be inserted into the recess by sliding the unloader 116 in a direction along the back surface 236, e.g., tangentially to the driveshaft body 160.

The radial clearance CR and the axial clearance CA between the unloader 116 and the recess 118 is such that the unloader 116 may be easily inserted into the recess 118. The method further includes inserting the driveshaft 138 into the ring opening 268 of the retention ring 264 and moving the retention ring 264 along the longitudinal axis A1, until the retention ring 264 is disposed within the annular channel 266. Some methods include stretching the retention ring 264 to expand the ring diameter $D_{264}$ of the ring opening 268 to pass the retention ring 264 over the diameter $D_{160}$ of the driveshaft body 160. Additionally, and/or alternatively, a lubrication material may be used to decrease friction between the retention ring 264 and the driveshaft body 160 to facilitate positioning the retention ring 264 within the annular channel 266. The method further includes inserting the driveshaft 138, including the unloader 116 retained in the recess 118 by the retention ring 264 into the inner ring 192 of the first bearing assembly 140, until the unloader 116 is axially aligned with the first bearing assembly 140 and the unloader 116 is engaged with the first bearing assembly 140.

Figure 12:
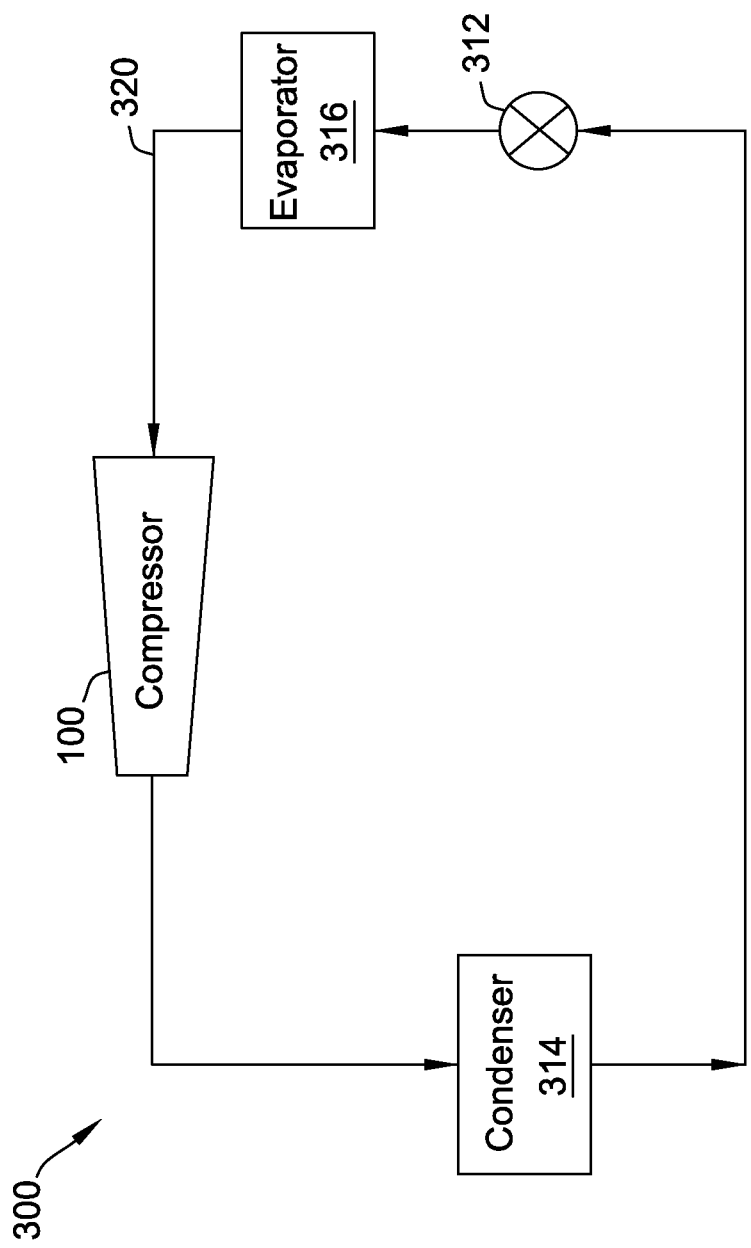
FIG. 12 is a schematic diagram of a cooling system including the compressor of FIG. 1.

Referring to FIG. 12, a schematic diagram of an example refrigeration system 300 using the compressor 100 is shown. The refrigeration system 300 includes the compressor 100, a condenser 314, an expansion device 312 (e.g., an expansion valve, orifice, capillary tube), and an evaporator 316. The refrigeration system 300 may include additional components or other components than those shown and described with reference to FIG. 12 without departing from the scope of the present disclosure. In operation, the compressor 100 receives a working fluid, such as a refrigerant, as a low-pressure gas through a suction line 320. The compressor 100 compresses the gas, thereby raising the temperature and pressure of the gas. The pressurized, high temperature gas then flows to the condenser 314, where the high-pressure gas is condensed to a high-pressure liquid. The liquid then flows through an expansion device 312 that reduces the pressure of the liquid. The reduced pressure fluid, which may be a gas or a mixture of gas and liquid after passing through the expansion device 312, then passes through the evaporator 316. The evaporator 316 may include a heat exchanger, with a fluid circulating therethrough that is cooled by the reduced pressure refrigerant fluid as the refrigerant fluid evaporates to a gas in the evaporator 316. The refrigerant gas is then directed back to the compressor 100 via the suction line 320, where the working fluid is again compressed and the process repeats.

Embodiments of the systems and methods described achieve superior results as compared to prior systems and methods. In particular, the unloader and bearing systems of the present provide radial compliance between the driveshaft and the orbiting scroll. The unloader and the bearing assembly of the present disclosure provide improved assembly, decreased assembly time, as compared to other unloader systems.

Example embodiments of bearing systems and methods, such as refrigerant compressors that incorporate the disclosed bearing system and methods of assembling compressors that include the disclosed bearing assembly, are described above in detail. The systems and methods are not limited to the specific embodiments described herein, but rather, components of the system and methods may be used independently and separately from other components described herein. For example, the bearing assemblies, including the driveshaft and the unloader described herein may be used in compressors other than refrigerant compressors, such as turbocharger compressors and the like.

When introducing elements of the present disclosure or the embodiment(s) thereof, the articles "a", "an", "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A compressor comprising:
   a shell;
   a driveshaft including a driveshaft body, an eccentric body, and a recess defined at least in part by a back surface;
   a non-orbiting scroll disposed within the shell;
   an orbiting scroll disposed within the shell, the eccentric body drivingly engaged with the orbiting scroll;
   a bearing housing fixed within the shell;
   a bearing supported by the bearing housing, the bearing axially spaced from the non-orbiting and orbiting scrolls; and
   an unloader at least partially received within the recess of the driveshaft, the unloader having inner and outer surfaces, the outer surface is engaged with the bearing, and wherein at least one of the back surface and the inner surface is curved and the unloader is pivotable within the recess relative to the driveshaft, wherein the outer surface of the unloader is curved and has a radius of curvature that is substantially the same as a radius of curvature of the driveshaft.

2. The compressor of claim 1, wherein the compressor further comprises:
   a retention ring configured to be received into a first channel formed on the outer surface of the unloader and a second channel formed on the driveshaft, wherein the retention ring retains the unloader at least partially within the recess of the driveshaft, wherein the retention ring is spaced from the bearing when the retention ring is disposed within the first and second channels.

3. The compressor of claim 2, wherein the retention ring includes an elastic material, and the bearing is disposed radially outward relative to the unloader.

4. The compressor of claim 1, wherein the unloader includes a first surface and an opposing second surface, wherein the inner surface extends between the first surface and the opposing second surface, and wherein the inner surface is convex in a direction parallel to an axis extending between the first surface and the second surface.

5. The compressor of claim 1, wherein the unloader includes a first surface and an opposing second surface, wherein the inner surface extends between the first surface and the opposing second surface, and wherein the inner surface is convex in a direction perpendicular to an axis extending between the first surface and the second surface.

6. The compressor of claim 1, wherein the inner surface of the unloader is dome shaped.

7. The compressor of claim 1, wherein the recess is defined, at least in part, by the back surface and an upper surface and an opposing lower surface, wherein the back surface is planar and the inner surface is curved.

8. The compressor of claim 1, wherein the recess includes a recess depth and the unloader includes a thickness that is greater than the recess depth such that at least a portion of the unloader extends outside of the recess in a radial direction of the driveshaft.

9. The compressor of claim 1, wherein the unloader is constrained in an axial direction of the driveshaft when the unloader is at least partially disposed within the recess.

10. The compressor of claim 1, wherein the bearing is disposed radially outward relative to the unloader.

11. A bearing assembly comprising:
   a driveshaft including a driveshaft body, an eccentric body, and a recess defined at least in part by a back surface;
   a bearing housing;
   a bearing supported by the bearing housing; and
   an unloader at least partially received within the recess of the driveshaft, the unloader having inner and outer surfaces, the outer surface engaged with the bearing, and wherein at least one of the back surface and the inner surface is curved and the unloader is pivotable within the recess relative to the driveshaft, wherein the outer surface of the unloader is curved and has a radius of curvature that is substantially the same as a radius of curvature of the driveshaft.

12. The bearing assembly of claim 11, wherein the bearing assembly further comprises:
   a retention ring configured to be received into a first channel formed on the outer surface of the unloader and a second channel formed on the driveshaft, wherein the retention ring retains the unloader at least partially within the recess of the driveshaft, wherein the retention ring is spaced from the bearing when the retention ring is disposed within the first and second channels.

13. The bearing assembly of claim 11, wherein the unloader includes a first surface and an opposing second surface, wherein the inner surface extends between the first surface and the opposing second surface, and wherein the inner surface is convex in a direction parallel to an axis extending between the first surface and the second surface.

14. The bearing assembly of claim 11, wherein the unloader includes a first surface and an opposing second surface, wherein the inner surface extends between the first surface and the opposing second surface, and wherein the inner surface is convex in a direction perpendicular to an axis extending between the first surface and the second surface.

15. The bearing assembly of claim 11, wherein the inner surface of the unloader is dome shaped.

16. A compressor system comprising:

a compressor operable to compress a refrigerant, the compressor comprising:

a shell;

a driveshaft including a driveshaft body, an eccentric body, and a recess defined at least in part by a back surface;

a non-orbiting scroll disposed within the shell;

an orbiting scroll disposed within the shell, the eccentric body drivingly engaged with the orbiting scroll;

a bearing housing fixed within the shell;

a bearing supported by the bearing housing, the bearing axially spaced from the non-orbiting and orbiting scrolls; and an unloader at least partially received within the recess of the driveshaft, the unloader having inner and outer surfaces, the outer surface is engaged with the bearing, and wherein at least one of the back surface and the inner surface is curved and the unloader is pivotable within the recess relative to the driveshaft, wherein the outer surface of the unloader is curved and has a radius of curvature that is substantially the same as a radius of curvature of the driveshaft;

a condenser downstream of the compressor; and an evaporator downstream of the condenser.

17. The compressor system of claim 16, wherein the compressor system further comprises:

a retention ring configured to be received into a first channel formed on the outer surface of the unloader and a second channel formed on the driveshaft, wherein the retention ring retains the unloader at least partially within the recess of the driveshaft, wherein the retention ring is spaced from the bearing when the retention ring is disposed within the first and second channels.

18. The compressor system of claim 16, wherein the unloader includes a first surface and an opposing second surface, wherein the inner surface extends between the first surface and the opposing second surface, and wherein the inner surface is convex in a direction parallel to an axis extending between the first surface and the second surface.

19. The compressor system of claim 16, wherein the unloader includes a first surface and an opposing second surface, wherein the inner surface extends between the first surface and the opposing second surface, and wherein the inner surface is convex in a direction perpendicular to an axis extending between the first surface and the second surface.

* * * * *